US008432414B2

(12) United States Patent
Vetterli et al.

(10) Patent No.: US 8,432,414 B2
(45) Date of Patent: Apr. 30, 2013

(54) AUTOMATED ANNOTATION OF A VIEW

(75) Inventors: Martin Vetterli, Grandvaux (CH); Serge Ayer, Matran (CH)

(73) Assignee: Ecole Polytechnique Federale de Lausanne (CH)

(*) Notice: Subject to any disclaimer, the term of this patent is extended or adjusted under 35 U.S.C. 154(b) by 1584 days.

(21) Appl. No.: 09/817,314

(22) Filed: Mar. 26, 2001

(65) Prior Publication Data

US 2002/0075282 A1 Jun. 20, 2002

Related U.S. Application Data

(63) Continuation-in-part of application No. 08/924,522, filed on Sep. 5, 1997, now Pat. No. 6,208,353.

(51) Int. Cl.
*G06T 15/00* (2011.01)

(52) U.S. Cl.
USPC ............. 345/632; 345/629; 345/630; 700/28; 710/8

(58) Field of Classification Search .................. 345/629, 345/630, 632; 700/28; 707/200; 710/8
See application file for complete search history.

(56) References Cited

U.S. PATENT DOCUMENTS

| | | | | |
|---|---|---|---|---|
| 4,718,101 A | * | 1/1988 | Ariga et al. | 382/180 |
| 5,031,224 A | * | 7/1991 | Mengel et al. | 382/155 |
| 5,067,161 A | * | 11/1991 | Mikami et al. | 382/222 |
| 5,544,045 A | * | 8/1996 | Garland et al. | 704/3 |
| 5,689,717 A | * | 11/1997 | Pritt | 395/773 |
| 5,729,471 A | * | 3/1998 | Jain et al. | 725/131 |
| 5,764,508 A | * | 6/1998 | Harper et al. | 700/28 |
| 5,917,449 A | * | 6/1999 | Sanderford et al. | 342/457 |
| 6,137,910 A | * | 10/2000 | Shinagawa et al. | 382/195 |
| 6,154,788 A | * | 11/2000 | Robinson et al. | 710/8 |
| 6,181,302 B1 | * | 1/2001 | Lynde | 345/7 |
| 6,208,353 B1 | * | 3/2001 | Ayer et al. | 345/634 |
| 6,292,830 B1 | * | 9/2001 | Taylor et al. | 709/224 |
| 6,307,556 B1 | * | 10/2001 | Ellenby et al. | 345/427 |
| 6,307,573 B1 | * | 10/2001 | Barros | 715/764 |
| 6,313,836 B1 | * | 11/2001 | Russell et al. | 345/419 |
| 6,327,594 B1 | * | 12/2001 | Van Huben et al. | 707/200 |
| 6,330,356 B1 | * | 12/2001 | Sundareswaran et al. | 382/154 |
| 6,401,105 B1 | * | 6/2002 | Carlin et al. | 707/512 |
| 6,587,601 B1 | * | 7/2003 | Hsu et al. | 382/294 |
| 6,611,725 B1 | * | 8/2003 | Harrison et al. | 700/98 |
| 6,765,569 B2 | * | 7/2004 | Neumann et al. | 345/419 |
| 6,904,392 B1 | * | 6/2005 | Marty et al. | 703/1 |
| 7,751,805 B2 | * | 7/2010 | Neven et al. | 455/414.3 |
| 7,835,577 B2 | * | 11/2010 | Grady | 382/173 |
| 7,840,059 B2 | * | 11/2010 | Winn et al. | 382/155 |

OTHER PUBLICATIONS

Phelps et al., Toward Active, Extensible, Networked Documents: Multivalent Architecture and Applications, pp. 100-108, Jun. 1996, University of California, Berkeley.*
Hermes et al., Content-based Image Retrieval, IBM Press, 1995, pp. 1-11.*
Rose et al., Annotating Real-World Objects Using Augmented Reality, ECRC-94-41, Technical Report, Jun. 1995, pp. 357-370.*
Majumdar et al, A CAD Model Based System for Object Recognition, Journal of Intelligence and Robotic System, Apr. 1997, pp. 351-365.*
Syeda-Mahmood, Data and Model-Driven Selection Using Color Regions, International Journal of Computer Vision, Jan. 1997, pp. 9-36.*

* cited by examiner

*Primary Examiner* — Phu K Nguyen
(74) *Attorney, Agent, or Firm* — Blank Rome LLP

(57) ABSTRACT

In a view, e.g. of scenery, of a shopping or museum display, or of a meeting or conference, automated processing can be used to annotate objects which are visible from a viewer position. Annotation can be of objects selected by the viewer, and can be displayed visually, for example, with or without an image of the view.

4 Claims, 7 Drawing Sheets

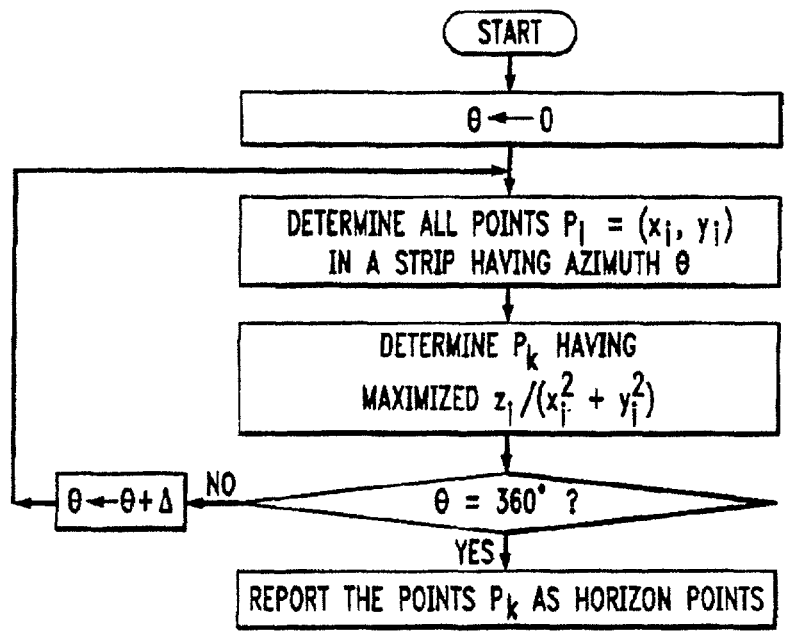
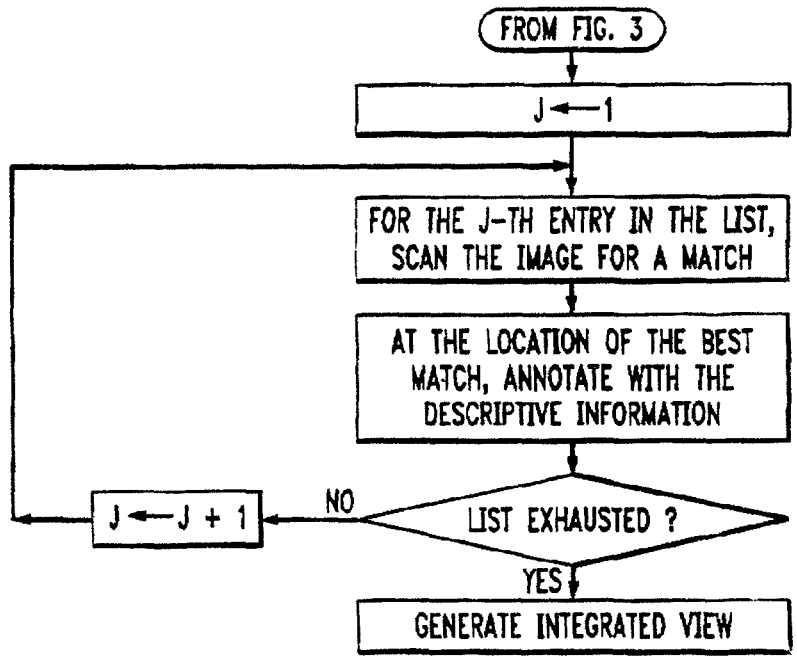

AUTOMATED ANNOTATION OF A VIEW

REFERENCE TO RELATED APPLICATION

This is a continuation-in-part application of application Ser. No. 08/924,522, filed Sep. 5, 1997, entitled "Automated Cartographic Annotation of Digital Images", now U.S. Pat. No. 6,208,353.

TECHNICAL FIELD

This invention relates to automated annotation of an element in a view.

BACKGROUND OF THE INVENTION

Electronic imaging systems have been developed which generate pictorial representations in digital form, using a digital camera or a digitizing scanner, for example, or using a computerized "virtual reality" generator. Typically, an image is represented by an array of a large number of "pixels" for which numerical parameter values are provided. In the case of black-and-white images, a single numerical value is sufficient per pixel, indicating brightness. For color images, three parameters are used, e.g. for levels of red, green and blue, or hue, saturation and intensity.

Digital image representation is advantageous in that such representations can be reproduced without loss, so that there is no degradation of image quality in copying. Also, digital images can be readily transmitted over high-speed data channels, and they can be processed by computerized techniques, e.g. for color correction, for manipulation as by "morphing", and for combining multiple images into a composite panoramic view. Panoramic views, obtained as a composite or otherwise, are of considerable importance to tourism, for example.

In pictorial views such as panoramic views, it is often desirable to annotate prominent features with identifying or characterizing information. For example, in a view of a mountain range, identifying information may be desired for prominent mountain peaks and other features at the horizon.

SUMMARY OF THE INVENTION

We have recognized that an element in a view can be annotated by a computerized technique, based on cartographic data or other suitable spatial information in digital form.

BRIEF DESCRIPTION OF THE DRAWING

FIG. 6 is a flow diagram for a method of horizon line extraction.

FIG. 7 is a flow diagram for matching and annotation processing.

DETAILED DESCRIPTION

Figure 1:
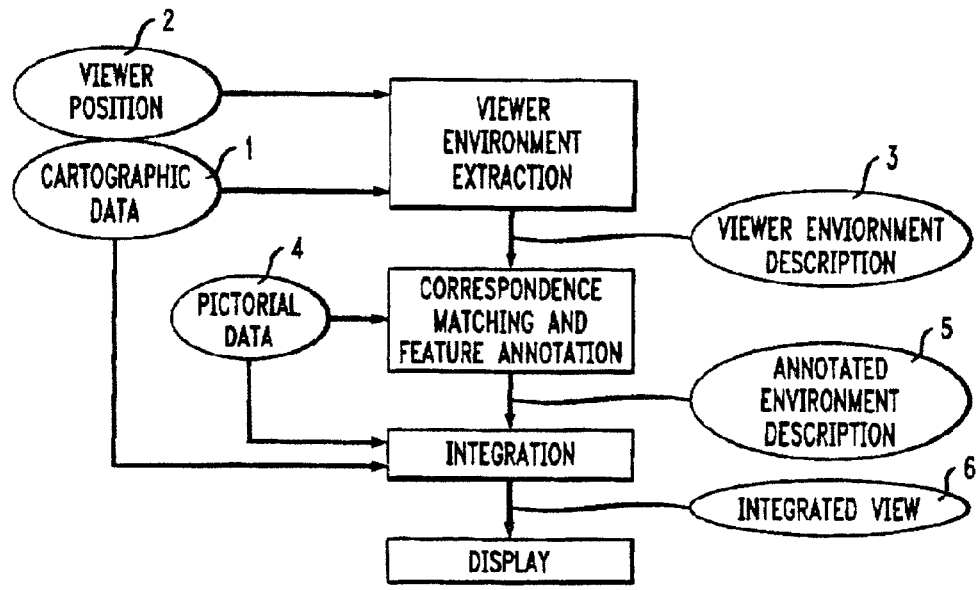
FIG. 1 is a block diagram for computerized processing.

Using correspondence matching between cartographic and pictorial data, the pictorial data can be annotated with cartographic data. As illustrated by FIG. 1, this technique includes the following procedural steps: (a) based on given cartographic data 1 and viewer position data 2, extracting the viewer environment 3, i.e., of cartographic features which are visible from the viewer position; (b) bringing the extracted cartographic features of the viewer environment into correspondence with features from the pictorial description data 4; (c) annotating the features in the pictorial data 4 based on the viewer environment 3, thus generating an annotated environment description 5; and (d) generating a desired integrated view 6 based on the pictorial data 4 and the annotated environment description 5.

Figure 2:
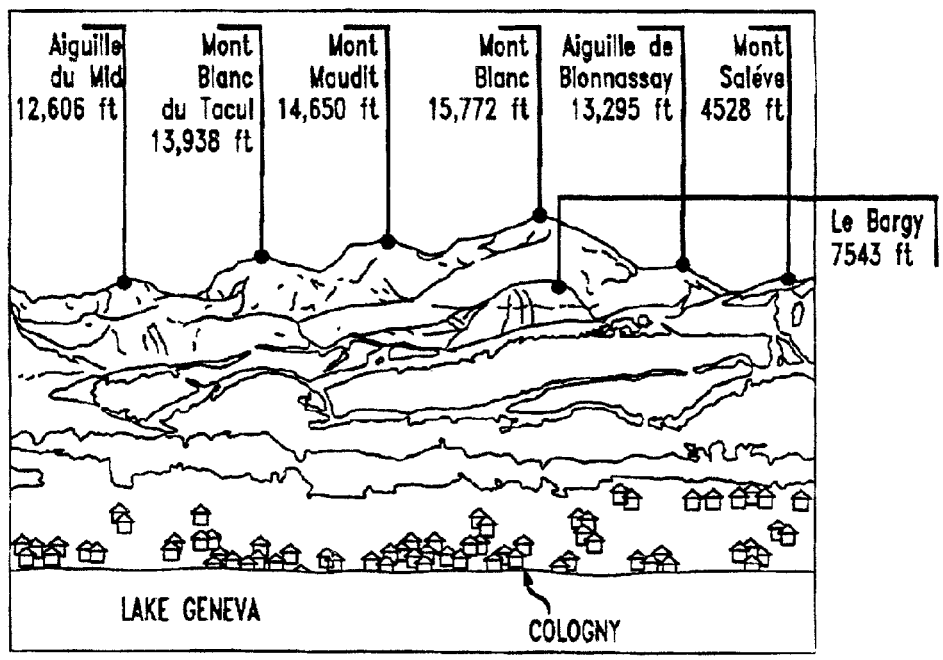
FIG. 2 is a representation of exemplary annotated pictorial output resulting from such processing.

An example of such an integrated view is shown as FIG. 2. The topographical features are as in a given image, and the textual annotations are taken from cartographic data. Annotated topographical features include six mountain peaks at the horizon, a lake and a town in the foreground, and a further mountain peak at mid-range.

Further details for the steps of the technique are as follows:

(a) Extraction of the Viewer Environment.

Given a viewer position, features are identified in the cartographic representation which are visible from the viewer position. Such features can include the horizon line, specific points on the horizon line, and significant geographical features such as lakes, mountains, forests and buildings, for example. The viewer position may be given as included with the pictorial data from the photographer's knowledge or from a localization system such as G.P.S. (Global Positioning System). Also helpful for present purposes are the viewing angle, e.g. as specified by azimuth and elevation, and the focal length of the view to be annotated.

Figure 3:
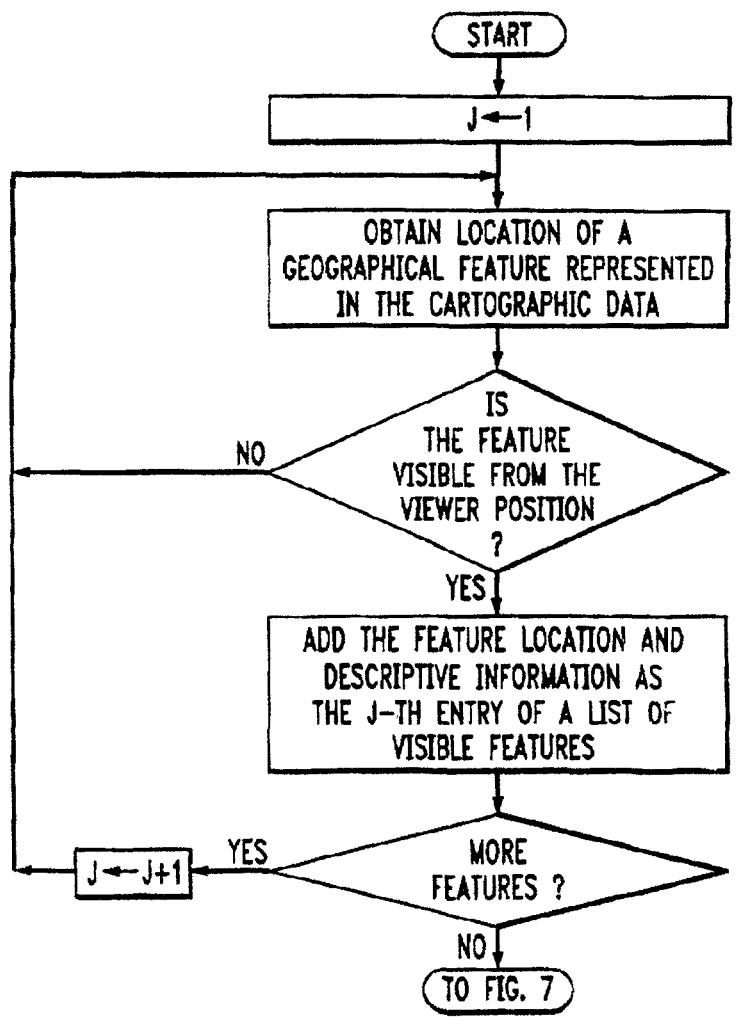
FIG. 3 is a flow diagram for feature extraction in processing.

From the cartographic data, the technique extracts a description of the viewer environment, resulting in a list of objects in view, together with their respective cartographic positions. This procedure is illustrated by FIG. 3. Features represented in the cartographic data are tested for visibility from the viewer position and, for each of the visible features, a table entry is generated including its cartographic position and descriptive information.

Figure 4:
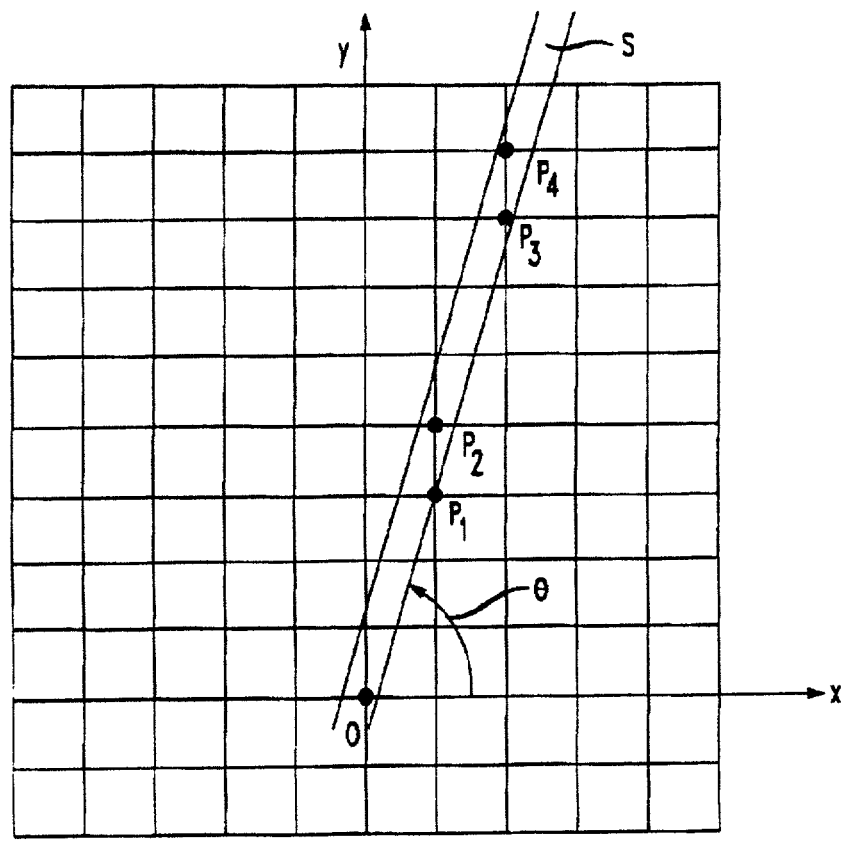
FIG. 4 is a cartographic grid of a map from which the horizon line is to be extracted.
Figure 5:
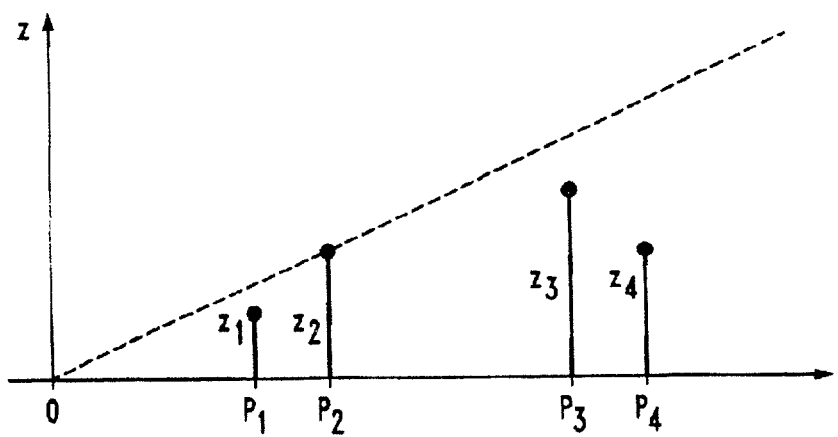
FIG. 5 is an elevation corresponding to a strip in the grid of FIG. 4.

Typically, e.g. in extracting the viewer environment for a scenic view, it is important to determine the horizon. A suitable technique for this purpose is illustrated by FIGS. 4-6. As shown in FIG. 4, with the origin of an x-y-coordinate system chosen at the viewer position O on the map, points $P_i=(x_i, y_i)$ are identified in a narrow strip S originating at the point O and having azimuth angle 0, say.

The identified points are shown also in FIG. 5 which is an elevation along the strip S. Shown further are the vertical coordinates z, corresponding to cartographic altitude. Finding a point of the horizon now amounts to identifying a point $(x_k, y_k)$ among the points $(x_i, y_i)$ for which the ratio $z_i/(x_i^2+y_i^2)$ is maximized. In the present case, point $P_2$ is at the horizon.

To obtain the horizon, the strip is swept through 360 degrees, by successively incrementing the value of 0 by a small amount, Δ. This procedure is illustrated by FIG. 6. If the view angle is known (at 90 degrees, for example), it suffices to sweep the angle alpha through 180 degrees only. This range may be reduced further if the focal length of the view to be annotated is provided. In some views, such as panoramic silhouettes, the horizon may be the only part of the viewer environment that is of interest. But the present technique is not so limited, as the extracted viewer environment can include visible features below the horizon. And indeed, the technique is applicable whether or not a view has a horizon of interest.

(b) Correspondence Matching.

A basic type of correspondence matching is illustrated by FIG. 7 which also illustrates steps (c) and (d). For each feature in the viewing environment recorded in step (a), a matching feature is found in the image. Alternatively, the extracted list can be globally matched to the pictorial data, by finding the best over-all match of the viewer environment in the image. A global matching measure can be used that takes into account every object and the confidence of each respective match.

As a simple example, in an image as shown in FIG. 2, the horizon can be traced readily by known techniques, based on the color or brightness of the sky as compared with the terrain. The traced horizon can be matched to the horizon obtained per (a) above, thus yielding a correspondence between features included in the map an features appearing in the image.

Automated matching can be facilitated by suitable calibration, e.g. by interactive establishment of the correspondence between a small number of distinguished points in the map and the image. For example, a user viewing the map and the image side by side may "click" first on a point in the map and then on the corresponding point in the image, thus establishing a first correspondence. The greater the number of correspondences thus established, the easier the technique's task of matching.

Automated matching can be facilitated also if the image is stereographic, i.e. represented by a pair of views from two specified points. Depth information obtained from a stereographic, 3-D view can be used to address ambiguities which a 2-D view may not resolve. Correspondence matching can be under user control so that a point is annotated in the view when the user clicks on the point.

(c) Annotating.

Based on the correspondence per (b) above, there results a list of annotations, with each annotation consisting of the cartographic information together with its position in the image.

(d) Integrated View.

Based on their location in the image, the annotations are superposed on the image, resulting in an integrated view. Successive integrated views can be used for browsing and searching, as each movement in the cartographic domain corresponds to a movement in the image domain and vice-versa. The two movements can be visualized together, thus facilitating browsing.

Another feature of the integrated view is the ability to superimpose different levels of cartographic information onto the picture, both dynamically on a screen or statically for printing. For example, if a view is changed as to focal length as in zooming, different levels of detail in the cartographic data may become relevant for inclusion in the viewer environment.

As, typically, geographical and pictorial data are supplied at different scales, the method can link annotations obtained at one scale with annotations obtained at other scales. For this purpose, a linked pyramid representation of annotations can be used, in which every annotation has offspring at a finer scale and ancestors at a coarser scale. Offspring of an annotation are more detailed annotations of a geographical object, and an ancestor of an annotation is a common annotation of several geographic objects. Some annotations may originate only at a sufficiently fine scale, as corresponding features may not be recognizable at coarser scales.

The following are among contemplated applications for the technique: automated generation of panoramic views for atlases, for the promotion of tourism, and for tourist information at popular locations; automated service, e.g. provided on the Internet, for annotating images taken with an electronic camera which also records the viewer position based on G.P.S. input, for example; automated automotive navigation system producing annotated panoramic views rather than mere cartographic views as at present; simulation system producing annotated views of terrain, providing for browsing and searching in cartographic and pictorial domains, with coupling of movement in the two domains; and real-time video system with continuous or intermittent annotation.

As an example of the use of a real-time video system, in aerial navigation, a helicopter pilot wearing a head-up display viewer (2-D or 3-D) may activate annotation of terrain features in actual view. In annotating, the system can use G.P.S. position information and available cartographic information. In selecting features for annotation, the system can respond to the stance of the pilot's head and/or the pilot's eyes.

In a further application, a video sequence can be annotated after it has been recorded, e.g. as a travel log. In either case, when annotating a view of a video sequence, correspondence matching between cartographic and pictorial features can take advantage of a correspondence established for a previous view in the sequence. The previous correspondence can serve as an "initial guess" from which the desired new correspondence can be established by iterative refinement.

Automated annotation of a view or scene can include highlighting, and inclusion of identifying and/or descriptive information other than cartographic information. An annotation can be generated selectively, e.g. in response to a pointer being positioned, and the annotation can be produced in different sensory forms including visual, auditory and tactile. In the following, "element" or "object" will designate anything of interest or potential interest in an image/video scene, to be annotated, highlighted or the like.

Figure 8:
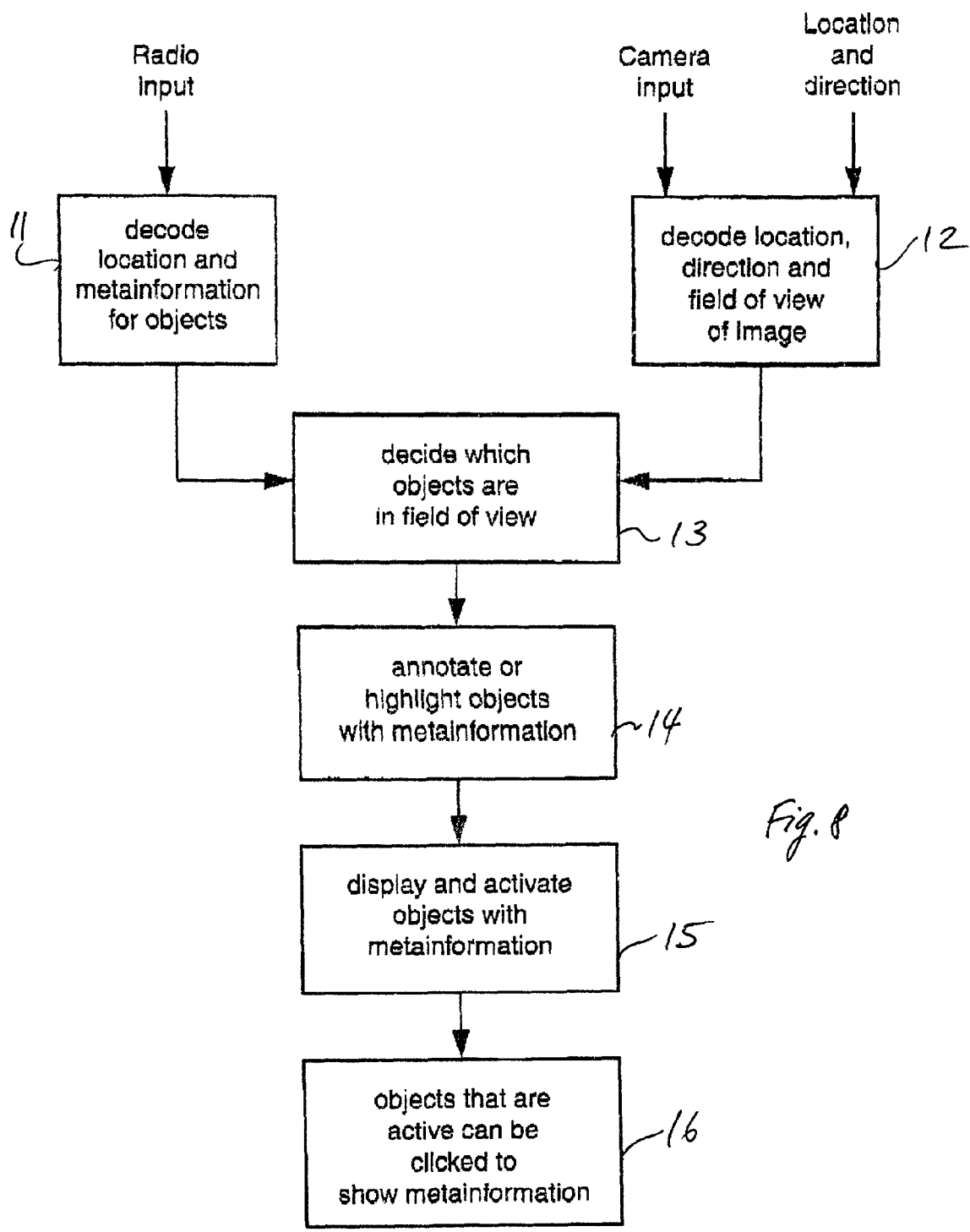
FIG. 8 is a block diagram for computerized inclusion of radio-transmitted information.

FIG. 8 illustrates a technique in accordance with an exemplary embodiment of the invention, using radio as well as camera visual, location and direction/orientation input. For objects, radio input provides information concerning their location, as well as meta-information for annotation. Radio input is decoded in module 11. Camera input is of an image representing a view, and of camera parameters from which location, direction and field of view are obtained in module 12. Data from modules 11 and 12 are used in module 13 to decide as to which objects are in view. In module 14, objects in view are annotated/highlighted. Module 15 serves for displaying and activating the objects with meta-information. In response to click commands for such objects, module 16 causes their meta-information to be displayed.

A. Tracking and Providing Meta-information

Typical ways for identifying an object/element include the following:

1. A database can be used for correlating image content with elements in the database, e.g. as described above in cartographic annotation.

2. An object in the scene can emit a radio beacon emitting information about the object, e.g. including its position. A portable camera device acquiring the scene can gather the information and place it in the image, based on the location of the object in the image. Establishing a correspondence between object and location in the image can be facilitated by use of emitted position information if available. Also, a camera acquiring image and beacon signals can be aware of its position and shooting orientation, so that, for placing the information, the camera can indicate the location of the beacon. The information then can be placed at an appropriate location, e.g. the location of the beacon or another suitably related location, e.g. in an image peripherally. A lead line can be included for positive association between an object and its annotation. In a further alternative for placing the information, the camera and radio receiver can locate the beacon through array processing. Among suitable transmission means other than radio are beacons of infrared or ultrasound, as well as established communication channels such as for mobile telephones, for example.

3. A base station can be used, for generating dispatching information including a user's position relative to objects. The base station can include one or more receivers, with use of at least two receivers being advantageous for triangulation of user(s) and objects. The objects may be active, e.g. as radio sources as described above, or passive, with known location. Then the image/video seen by the user can be annotated by information provided from the base station, and based on camera position and shooting direction. For example, participants in a meeting can be annotated on a live image by tracking their position, so that a speaker using an unfamiliar language can appear as accompanied by a text translation of his words.

4. Tracking can be based on visual cues as used in computer vision, either of an object, its environment, or a target placed on the object. The tracked object then can be annotated with relevant meta-information. In a store, for example, if labels on goods are tracked, information can be added on a display concerning promotions and price of objects at which the camera is pointed.

Tracking methods can be used individually or in combination. Methods can complement each other based on their resolution, e.g. with radio tracking for coarse location and optical for fine localization B. Adding Information The following are among ways to annotate or add information to a selected object: (i) making the object "clickable", so that, when the object is clicked, additional information will be displayed; (ii) highlighting the object, by segmenting it from the background as additional information is being displayed; (iii) making a list of objects in an image, with associated information, e.g. to display the names of individuals in an image; and (iv) displaying information concerning an object without even displaying the object itself, using any suitable position and data capture technique as described above.

C. Establishing Correspondences

For bringing objects, their representations, and their associated information into correspondence, centralized or decentralized processing can be employed. For example, in cartographic annotation, all objects are maintained with their coordinates and associated information together in the same database. In decentralized processing this need not be the case, and hybrid arrangements also can be advantageous. For example, the names of restaurants in a locality can be obtained from a database such as the Yellow Pages, their regular menus from separate further databases, and their daily specials dispatched with a beacon.

An object can be annotated based on the relative position of a display device with respect to the object, including their spatial relationship and the orientation of the device. In case of images or video, the relative position of an element on a screen can be calculated from camera parameters and relative position information of the camera with respect to the element. Where annotation is displayed without displaying an image of the element, the information to be displayed can be selected based on location and orientation of a display device in relation to the element pointed to. Also, a beacon signal can be used that is sufficiently directional and/or having a sufficiently directional capture. The beacon signal can carry identifying information and possibly annotation information.

D. Representative Applications

Annotation of images and video can be used live, e.g. for training and guidance, and for information services, augmented reality, shopping, and meeting enhancement.

More specifically as to training and guidance, where a piece of machinery needs to be manufactured or repaired, for example, a database of key points can be interactively pointed out, with associated information. Thus, an assembly worker or repairperson can be trained or guided to perform required actions such as mounting a certain part at its proper location.

Information services can be implemented so as to avoid unsightly signs and billboards in front of shops and restaurants, e.g. at scenic localities. An annotated image can provide additional information specific to an element, as well as more general information, e.g. tourist information. In another application, in road signaling, signs can be augmented with additional information, e.g. for use by road navigation systems.

Figure 9:
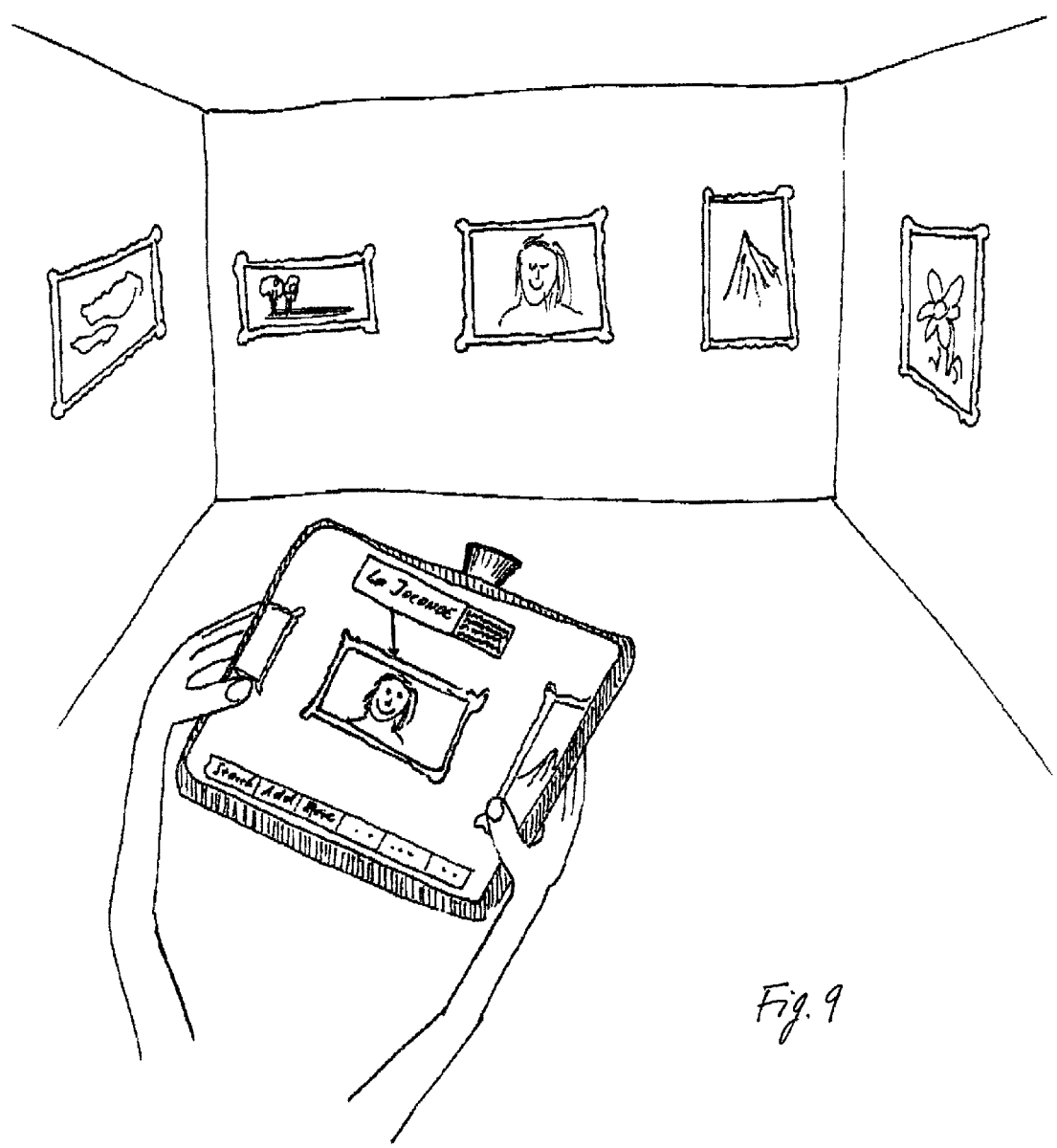
FIG. 9 is a pictorial representation of automated annotation at a museum.

Yet another application is illustrated by FIG. 9. In a museum information system, a hand-held device displays an image of a view including artwork on display. The device shows a portrait, annotated with the caption "La Joconde", and additional text which may include relevant information such as the name of the artistic author. The device may have a touch screen, for annotation display triggered by touch. Alternatively, e.g. with a mere alphanumeric screen, the display may result upon mere pointing of the device.

In an augmented reality system, specific information about objects, distances, angles, speeds and the like can be included in a live image or video, of interest in navigation systems, for example.

For shopping, a warehouse, shopping mall or store can be enhanced by supplying additional descriptive and/or price information for an object on an image showing the object.

Figure 10:
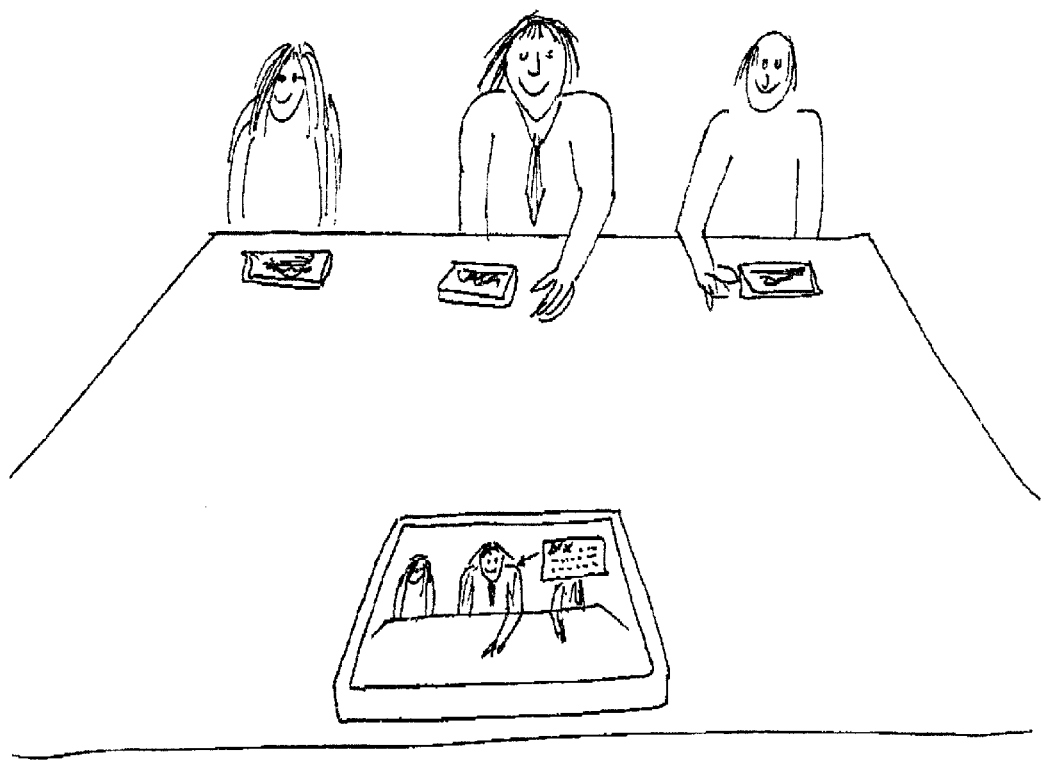
FIG. 10 is a pictorial representation of automated annotation at a conference.

In a meeting, a participant can use a personal device which serves as beacon and display as illustrated by FIG. 10. When oriented towards another participant, such as here the middle person in the display, a device can include identifying information as annotation of the participant. If the participant speaks in an unfamiliar tongue, automated translation can be displayed in the form of text.

D. Exemplary Implementation

The technique can be implemented for use with a portable device, e.g. a device including a camera in which case a moving image can be annotated. Or, without a camera in a palm device, for example, a fixed view can be shown with annotation. A touch screen can be used, for pointing at an object. Further without requiring a camera, and even with limited display capability as in the case of a portable phone, annotation information can be produced so long as device location and possibly orientation information is available. Then, information can be provided in response to pointing the device. Device pointing may involve other than hand motion, e.g. head motion with virtual reality goggles or glasses which can show a computer-generated view in combination with a direct view. Such motion may also be of large objects such as a car, ship or plane in automotive, marine and aerial navigation systems.

We claim:

1. A computerized method for annotating, comprising the steps of:

capturing a digital image of a view having an element with a mobile phone including a camera;

selecting an element from the captured image;

obtaining an identification of the selected element from the captured image on the basis of the location of the mobile phone and visual cues which can be identified in the captured image;

relating the identification to annotating data associated with the element;

superimposing said annotating data on said view; and causing the data to be displayed on a display.

2. A system for annotating, comprising:

a mobile phone including a camera for capturing a digital image of a view having an element;

means for obtaining an identification of the element on the basis of the location of the mobile phone and visual cues which can be identified in the captured image;

means for relating the identification to annotating data associated with the element;

means for superimposing said annotating data on said view; and a display for displaying the data.

3. A computerized method for annotating, comprising the steps of:

capturing a digital image of a view having an element with a camera;

displaying said digital image on a display;

receiving a radio signal sent by a radio sender of said element, wherein the radio signal comprises location data and meta-information associated with said element;

determining the location and shooting orientation of the camera;

using the location data provided in the radio signal, the position of the camera and the shooting orientation of the camera, to determine the position of said element in the digital image;

retrieving meta-information associated with the element from the radio signal; and superimposing annotating data corresponding to said meta-information on said view.

4. A computerized method for annotating, comprising the steps of:

capturing a digital image of a view having an element with a camera in a mobile phone;

determining the position and shooting direction of said camera;

displaying said view on a display of said mobile phone;

using said position, said shooting direction and visual cues for relating a selected element to annotating data associated with the element; and superimposing said annotating data on said display.

* * * * *